United States Patent
Mammel

(10) Patent No.: US 8,291,804 B2
(45) Date of Patent: Oct. 23, 2012

(54) DRIVE UNIT WITH ROTATING SAW BLADE FOR CONNECTION TO A ROBOT

(75) Inventor: Erich Mammel, Mühlacker-Lienzingen (DE)

(73) Assignee: Schmid & Wezel GmbH & Co., Maulbronn (DE)

( * ) Notice: Subject to any disclaimer, the term of this patent is extended or adjusted under 35 U.S.C. 154(b) by 328 days.

(21) Appl. No.: 12/244,628

(22) Filed: Oct. 2, 2008

(65) Prior Publication Data
US 2009/0025521 A1    Jan. 29, 2009

Related U.S. Application Data

(63) Continuation of application No. PCT/EP2007/003583, filed on Apr. 24, 2007.

(30) Foreign Application Priority Data

Apr. 28, 2006   (DE) .................. 20 2006 007 224 U

(51) Int. Cl.
*B27B 5/32* (2006.01)

(52) U.S. Cl. ........... 83/698.11; 83/666; 83/469; 83/478; 30/388; 451/508; 451/359; 451/342

(58) Field of Classification Search .................. 83/481, 83/663–666, 571, 698.11, 698.41, 698.51, 83/469, 478; 451/508, 359, 342, 344; 30/388; 403/1

See application file for complete search history.

(56) References Cited

U.S. PATENT DOCUMENTS

| | | | |
|---|---|---|---|
| 2,842,908 A | 7/1958 | Allison | |
| 2,981,300 A | 4/1961 | Peterson | |
| 3,353,306 A * | 11/1967 | Seymour et al. | 451/342 |
| 4,576,073 A | 3/1986 | Stinson | |
| 4,909,113 A | 3/1990 | Ischenko | |
| 6,591,725 B1 * | 7/2003 | Martin | 83/471.3 |

FOREIGN PATENT DOCUMENTS

| | | |
|---|---|---|
| DE | 102004022346 | 9/2005 |
| DE | 102004024077 | 12/2005 |

OTHER PUBLICATIONS

International Search Report PCT/EP2007/003583.

* cited by examiner

*Primary Examiner* — Phong Nguyen
(74) *Attorney, Agent, or Firm* — Brinks Hofer Gilson & Lione

(57) ABSTRACT

Drive unit with a rotating saw blade which is hinged inside of a protective hood, for connection to a robot, shaped by an enclosure that can be connected to the robot in which a shaft is positioned, by means of which the saw can be powered under intermediate connection to a gearbox. The saw blade is held between two firmly connected internal rings which are arranged on both sides of the saw blade and contain it, as well as being connected to each other. The rings are rotatably mounted within non-rotating external rings that are connected to the protective hood. The device that is formed by the saw blade, the internal rings and the external rings is fastened in a removable way to a drive hub that is powered by the gearbox.

9 Claims, 3 Drawing Sheets

DRIVE UNIT WITH ROTATING SAW BLADE FOR CONNECTION TO A ROBOT

CROSS-REFERENCE TO RELATED APPLICATIONS

This application is a continuation of International Application No. PCT/EP2007/003583 filed on Apr. 24, 2007, which claims the benefit of DE 20 2006 007 224.1, filed Apr. 28, 2006. The disclosures of the above applications are incorporated herein by reference.

FIELD

The invention relates to a drive unit for connection to a robot as well as a saw blade.

BACKGROUND

The statements in this section merely provide background information related to the present disclosure and may not constitute prior art.

Devices for changing saw blades are known in the art, and one suchent device is disclosed in U.S. Pat. No. 4,909,113. This disclosure, however, does not provide the required clamping precision. The clamping devices provided along the perimeter are too complicated, involve an excessively high weight and, in case of even the smallest inaccuracy, cause an unbalance of the rotating mechanism and consequently vibrations, which impair the mode of operation.

SUMMARY

In one form, the present invention provides a drive unit in which the saw blade may be easily replaced.

The ease of exchangeability of the entire unit particularly allows rapid replacement for inspection, cleaning and regrinding of the saw blade. The robot's work is only interrupted for a short time. The removal and replacement of the saw blade with protective cover also reduces the risk of injury to the person performing this activity. Not having to replace the saw blade directly at the robot entails considerable handling advantages.

Further areas of applicability will become apparent from the description provided herein. It should be understood that the description and specific examples are intended for purposes of illustration only and are not intended to limit the scope of the present disclosure.

DRAWINGS

Figure 1:
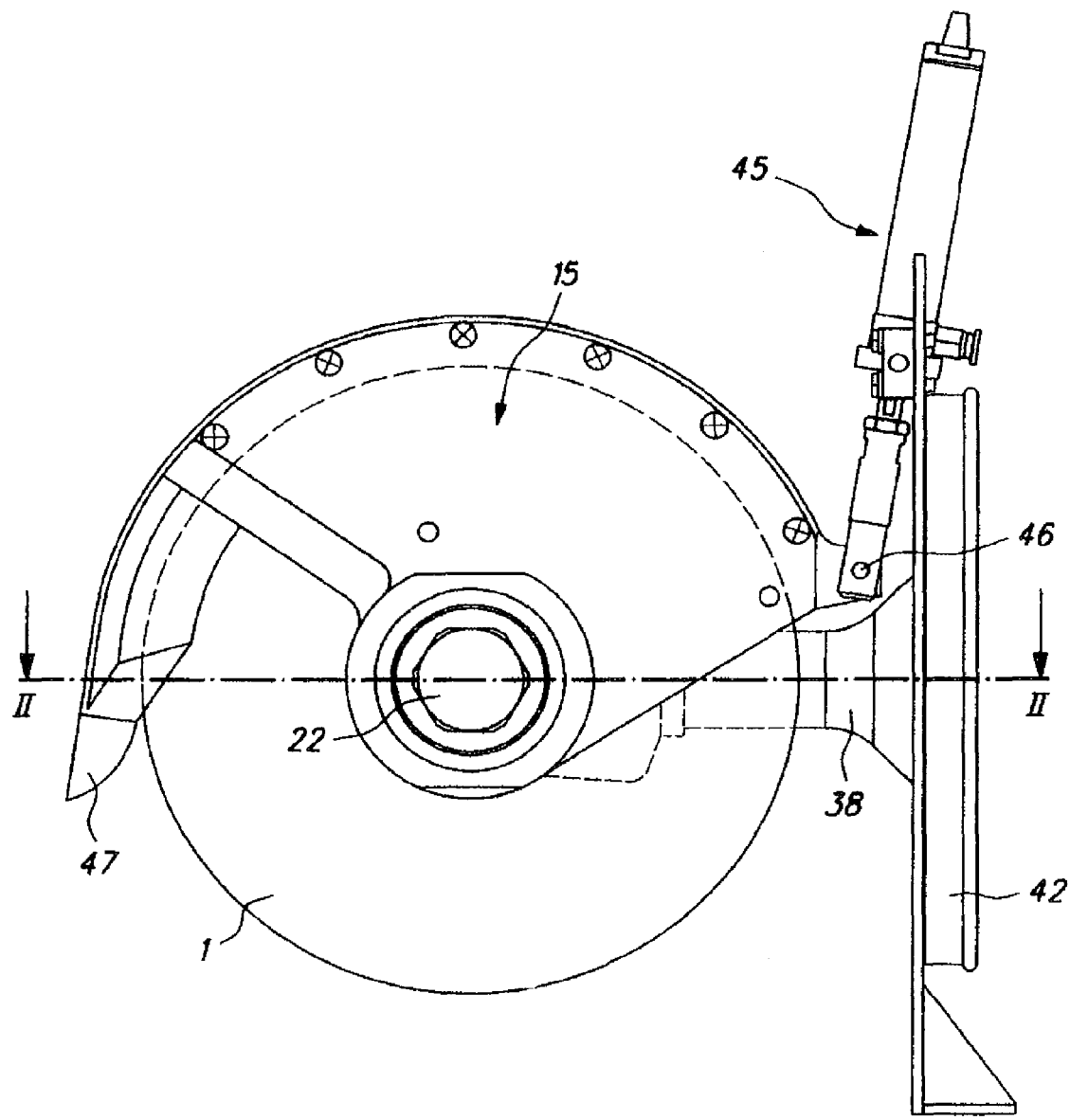
Figure 2:
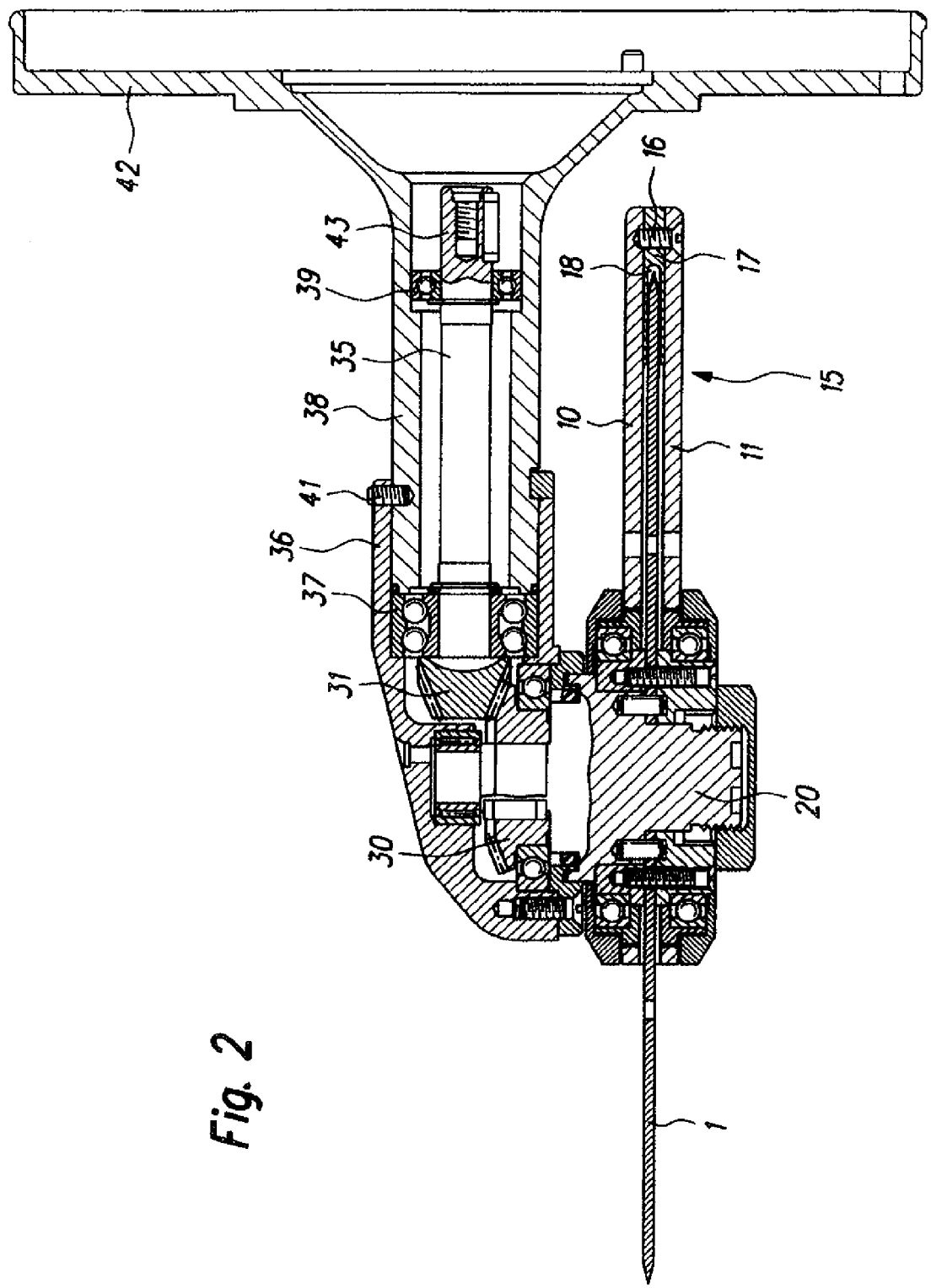

In order that the disclosure may be well understood, there will now be described various forms thereof, given by way of example, reference being made to the accompanying drawings, in which:

FIG. 1 an exemplary embodiment;

FIG. 2 a sectional view in the direction of the arrows II-II of FIG. 1; and

Figure 3:
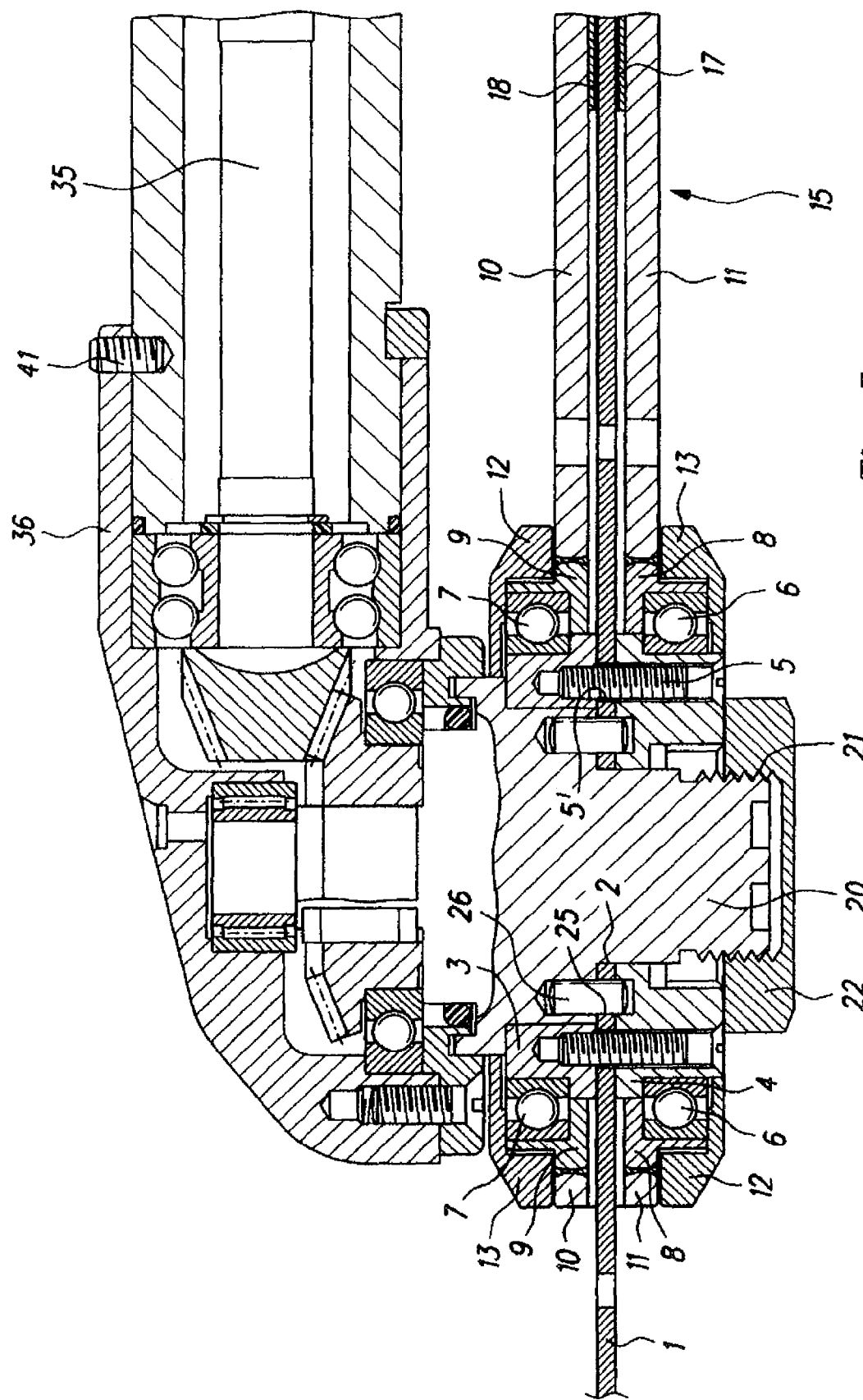

FIG. 3 an enlarged illustration of the left side of FIG. 2.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

FIG. 1 shows the entire unit with a saw blade 1. As is apparent from FIG. 2, the saw blade 1 has a round opening 2. The saw blade 1 is clamped along the perimeter of the opening 2 between two inner rings 3 and 4, which are arranged on both sides of the saw blade 1. The rings 3 and 4 are bolted to one another and to the saw blade 1 by means of three bolts 5 (of which only two are visible) that are arranged along the perimeter. The bolts 5 extend into the saw blade 1 through the openings 5'. The inner diameter of the rings 3 and 4 is equal to that of the opening 2 of the saw blade 1. Ball bearings 6 and 7 are each mounted on the outside onto the rings 3 and 4 such that the unit formed by the saw blade 1 and the inner rings 3, 4 may be rotated in the outer rings 8, 9, the saw blade 1 extending with a clearance through the space between the outer rings 8 and 9. Side plates 10, 11 of a protective cover 15 are firmly connected (for example soldered) to the outer rings 8, 9. Thus, the protective cover 15 does not rotate together with the saw blade 1 when the latter is driven. The ball bearings 6, 7 are covered with cover plates 12, 13 on both sides. Both side plates 10, 11 of the protective cover 15 are also bolted along part of the perimeters thereof to one another on the outside by means of bolts 16. The clearance between the side plates 10, 11 is ensured by a half ring 17, which as shown extends a certain distance inward and is provided with a slot 18, into which the outer perimeter of the saw blade 1 extends. The saw blade 1 must not brush against the inner surfaces of the slot 18, but at the same time the clearance has to be small enough so that no bone fragments may be drawn into the protective cover 15.

The unit formed by the saw blade 1, the inner rings 3, 4, the outer rings 8, 9, the cover plates 12, 13 and the side plates 10, 11 of the protective cover 15, is mounted onto the drive hub 20, the outer end of which is provided with a thread 21. This unit is bolted onto the drive hub 20 via a nut 22 and may be easily and quickly replaced by opening this bolted joint. The exact fit is ensured in that the saw blade 1 has openings 25 along the perimeter thereof, with pins 26 that are uniformly distributed on the drive hub 20 along the perimeter engaging in said openings. Thus, the inner rings 3, 4 and the saw blade 1 rotate on rotation of the drive hub 20, while the outer part of this unit, which is formed by the outer rings 8, 9, the cover plates 12, 13 and side plates 10, 11 of the protective cover 15 with engaging nose 47, as shown in FIG. 1, may be placed in different positions with respect to an animal ready for slaughter by means of a stationary piston/cylinder arrangement 45, which acts upon the protective cover 15 at 46, for example at a 23° position relative to the shown 0° position when the abdomen and breast bone are cut through (cf. DE 10 2004 022 346), or in a 90° position for complete release of the saw blade 1 when cutting the collar bone of the slaughtered animal. The connection at 46 must obviously be released when the above-mentioned unit is replaced, which may be performed in an easy manner, as it is only a bolt.

The drive hub is driven by a shaft 35 via the pinions 30 and 31, said shaft 35 being mounted in the housing 36 by means of bearings 37 and in the housing 38 by means of bearings 39. The housings 36, 38 are connected to one another by means of the bolt 41. The housing 38 merges into the flange 42, which is adjacent to the motor housing. On attachment of this robot connecting plate to the motor housing of the robot, the end 43 of the shaft 35 meshes with the motor drive shaft of the robot.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A drive assembly with a rotating saw blade arranged in a rotatable manner in a protective cover for the connection of a robot, composed of a housing that can be connected to the robot, a shaft via which the saw blade can be driven by interposing a gearbox being mounted in said housing, characterized in that the saw blade is held between two inner rings, which are arranged on both sides of the saw blade and accommodate it and are firmly connected to one another and to said saw blade, and which are accommodated in a rotatable manner in non-rotating outer rings connected to the protective cover, the protective cover having side plates firmly connected to the outer rings, wherein the saw blade, the inner rings, the outer rings, and the side plates of the protective cover define a unit such that the saw blade, the inner rings, the outer rings, and the protective cover remain as a unit during installation onto and removal from a drive hub, the drive hub having a bolted joint.

2. The drive unit according to claim 1, characterized in that the inner rings connected to the saw blade are mounted in the outer rings by means of ball bearings, which are covered by cover plates.

3. The drive unit according to claim 1, characterized in that said unit is bolted to the drive hub.

4. The drive unit according to claim 1, characterized in that the end of the drive hub is provided with a thread, onto which a nut is bolted.

5. The drive unit according to claim 1, characterized in that the unit containing the saw blade is accommodated in a positive manner by pins engaging in openings, one of the elements of the pins and openings being provided on the drive hub and the other element on one of the inner rings.

6. A saw blade for a drive unit according to claim 5, characterized in that near the openings intended for accommodating the drive hub it is provided along the inner perimeter with first openings at a first distance to the center for accommodating the bolts for bolting the inner rings to the saw blade and with second openings at a second distance to the center for accommodating the pins.

7. The drive unit according to claim 1, characterized in that both inner rings arranged opposite one another on both sides of the saw blade are bolted to one another and to the saw blade, the bolts extending through corresponding openings in the saw blade.

8. The drive unit according to claim 1, characterized in that the outer perimeter of the saw blade is guided with a small clearance in a slot of a half ring, which is arranged between the side plates of the protective cover.

9. The drive unit according to claim 1, characterized in that a stationary adjustment means acts upon the protective cover.

* * * * *